US009148232B2

(12) United States Patent
Yamamoto et al.

(10) Patent No.: US 9,148,232 B2
(45) Date of Patent: Sep. 29, 2015

(54) COMMUNICATIONS SYSTEM (75) Inventors: Keisuke Yamamoto, Kokubunji (JP); Hiroshi Shinoda, Kodaira (JP); Takahide Terada, Tokyo (JP); Junichi Sakano, Hitachi (JP); Kohei Onda, Tokai (JP)

(73) Assignee: Hitachi, Ltd., Tokyo (JP)

( * ) Notice: Subject to any disclaimer, the term of this patent is extended or adjusted under 35 U.S.C. 154(b) by 149 days.

(21) Appl. No.: 13/885,182

(22) PCT Filed: Dec. 27, 2010

(86) PCT No.: PCT/JP2010/073568
§ 371 (c)(1),
(2), (4) Date: May 14, 2013

(87) PCT Pub. No.: WO2012/090271
PCT Pub. Date: May 7, 2012

(65) Prior Publication Data
US 2013/0236189 A1    Sep. 12, 2013

(51) Int. Cl.
*H04B 10/00* (2013.01)
*H04B 10/80* (2013.01)
*H01P 1/30* (2006.01)

(52) U.S. Cl.
CPC .............. *H04B 10/808* (2013.01); *H01P 1/30* (2013.01)

(58) Field of Classification Search
CPC ............................. H04B 10/808; H01P 1/30
USPC ...................................................... 398/116
See application file for complete search history.

(56) References Cited

U.S. PATENT DOCUMENTS

| 5,170,415 | A | * | 12/1992 | Yoshida et al. | 375/326 |
| 5,896,375 | A | * | 4/1999 | Dent et al. | 370/347 |
| 5,977,924 | A | * | 11/1999 | Takei et al. | 343/770 |
| 6,124,830 | A | * | 9/2000 | Yuanzhu | 343/700 MS |
| 8,816,823 | B2 | * | 8/2014 | Tezuka et al. | 340/10.1 |
| 2004/0024937 | A1 | | 2/2004 | Duncan et al. | |
| 2008/0106469 | A1 | * | 5/2008 | Kikkawa et al. | 343/700 MS |
| 2008/0238796 | A1 | * | 10/2008 | Rofougaran | 343/776 |
| 2010/0090903 | A1 | * | 4/2010 | Byun et al. | 343/700 MS |

(Continued)

FOREIGN PATENT DOCUMENTS

| JP | 2010-103982 A | 5/2010 |
| JP | 2010-114696 A | 5/2010 |

(Continued)

OTHER PUBLICATIONS

Glenn et al; Microstrip Antenna Arrays on Multilayer LCP substrates; NASA tech Briefs Jan. 2007; pp. 14-15.*

*Primary Examiner* — Ken Vanderpuye
*Assistant Examiner* — Amritbir Sandhu
(74) *Attorney, Agent, or Firm* — Miles & Stockbridge P.C.

(57) ABSTRACT

In order to provide a communication system which performs a communication while maintaining high voltage insulation, a control circuit which is operated at a low voltage, and a controlled circuit which is operated at a high voltage are connected through a propagation layer having a waveguide structure, thereby performing a communication. In particular, a displacement current (surge current) flows between a high voltage circuit and a low voltage circuit due to a potential fluctuation which occurs in the high voltage circuit A surge current protection circuit is provided, and applying an input which is out of rating to the communication module and the low voltage circuit due to such a surge current is prevented.

8 Claims, 10 Drawing Sheets

(56) References Cited

U.S. PATENT DOCUMENTS

| | | | |
|---|---|---|---|
| 2010/0150552 A1* | 6/2010 | Furuyama | 398/38 |
| 2010/0232077 A1* | 9/2010 | Worley | 361/56 |
| 2010/0290787 A1* | 11/2010 | Cox | 398/115 |
| 2011/0165847 A1* | 7/2011 | Kawasaki | 455/73 |
| 2011/0221547 A1 | 9/2011 | Tezuka et al. | |
| 2012/0074496 A1* | 3/2012 | Jalilizeinali et al. | 257/355 |
| 2012/0269522 A1* | 10/2012 | Kagaya | 398/183 |
| 2013/0094430 A1* | 4/2013 | Mills et al. | 370/315 |
| 2013/0202308 A1* | 8/2013 | Middleton et al. | 398/116 |
| 2013/0209917 A1* | 8/2013 | Himeno et al. | 429/509 |
| 2014/0253382 A1* | 9/2014 | Markish et al. | 342/385 |

FOREIGN PATENT DOCUMENTS

| | | |
|---|---|---|
| WO | WO 2009012794 A1 * | 1/2009 |
| WO | WO 2010/035740 A1 | 4/2010 |

* cited by examiner

COMMUNICATIONS SYSTEM

TECHNICAL FIELD

The present invention relates to a communications system which performs communications while maintaining high voltage insulation.

BACKGROUND ART

As an example, in a motor control inverter which handles high electric power, an IGBT (Insulated Gate Bipolar Transistor) has been widely used as a switching element. It is necessary to perform a communication of a control signal while maintaining high voltage insulation between a gate driver which drives an inverter and a logic part which outputs a driving control signal to the gate driver. As a method of transmitting a signal by electrically insulating between circuits of which reference potentials are different from each other, a method of using an insulating element such as photo coupler, or a transistor has been known. An insulating element based on a different coupling method such as optical coupling, magnetic coupling, or capacitance coupling has been known, however, for use with high electric power/high voltage, a method of performing communications of control signals using an optical module and an optical fiber with excellent insulating property is mainstream. An example of an inverter control system using an optical fiber is disclosed in PTL 1. In PTL 2, a communication system in which a small amount of electromagnetic wave is leaked is realized at low cost by connecting a wireless communicator to a sheet having a waveguide structure which is configured by a mesh layer, a conductor layer, and a dielectric layer, and receiving an electromagnetic wave which leaks from the mesh layer through an antenna.

CITATION LIST

Patent Literature

PTL 1: US 2004/0024937 A1
PTL 2: JP-A-2010-114696

SUMMARY OF INVENTION

Technical Problem

In a method in which high voltage insulation is maintained using an optical fiber, an insulating property is excellent, however, a large space for mounting the optical fiber is required, and the replacement costs due to breakage of the optical fiber also becomes expensive. It is preferable to provide a communication system in which high solidity (for example, resistance to vibration is improved), miniaturization, and low cost can be obtained.

Solution to Problem

Provided is communication means which has high solidity, and can be miniaturized while maintaining high voltage insulation by connecting a logic part with a low voltage/low withstand voltage (low voltage circuit), and a driving unit with a high voltage/high withstand voltage (high voltage circuit) through a layer having a waveguide structure which is performed with insulation processing.

Advantageous Effects of Invention

It is possible to construct a communication system in which low cost, high solidity, and miniaturization can be obtained by performing a communication through a layer having a waveguide structure in which a low voltage circuit and a high voltage circuit are integrally formed.

BRIEF DESCRIPTION OF DRAWINGS

FIG. 3 is a configuration example of the insulating communication system in which a multilayer substrate is used, in which FIG. 3(A) is a cross-sectional view, FIG. 3(B) illustrates a shape of the antenna surface, and FIG. 3(C) illustrates a shape of an opening portion.

FIG. 4 is a configuration diagram of the insulating communication system in which the multilayer substrate is used, in which FIG. 4(A) is a cross-sectional view, FIG. 4(B) illustrates a shape of an antenna shield conductor, and FIG. 4(C) illustrates a shape of an opening portion.

Both

FIG. 6 is an explanatory diagram which illustrates a structure for realizing a small waveguide structure of a plurality of channels, in which FIG. 6(A) illustrates a shape of the antenna surface, FIG. 6(B) illustrates an opening portion, and FIG. 6(C) illustrates a shape of a shield.

FIG. 7 is an explanatory diagram which illustrates a configuration of a communication module, in which FIG. 7(A) is a communication module corresponding to a single channel, and FIG. 7(B) is a communication module corresponding to multi channels.

FIG. 8 is an explanatory diagram which illustrates a separate configuration of a communication module, in which FIG. 8(A) is an example in which channels are separated using a frequency, and FIG. 8(B) is an example in which an isolator is provided between the communication modules.

FIG. 9(A) illustrates an antenna surface, and FIG. 9(B) illustrates a shape of the opening portion.

DESCRIPTION OF EMBODIMENTS

Hereinafter, embodiments will be described using diagrams. In the descriptions below, performing a communication while maintaining electrical insulation between circuits is described as an insulating communication. In the insulating communication, since a propagation path which is used for transmitting a signal is a waveguide, signal lines and grounds of the primary side and the secondary side which perform a communication are separated in terms of DC. For practical use, it is important to provide a structure in which a withstand voltage is secured. Securing of insulation in a communication through such a waveguide can be realized by designing electrical coupling between a low voltage circuit and a high voltage circuit which perform a communication to be in a desired range.

Figure 1:
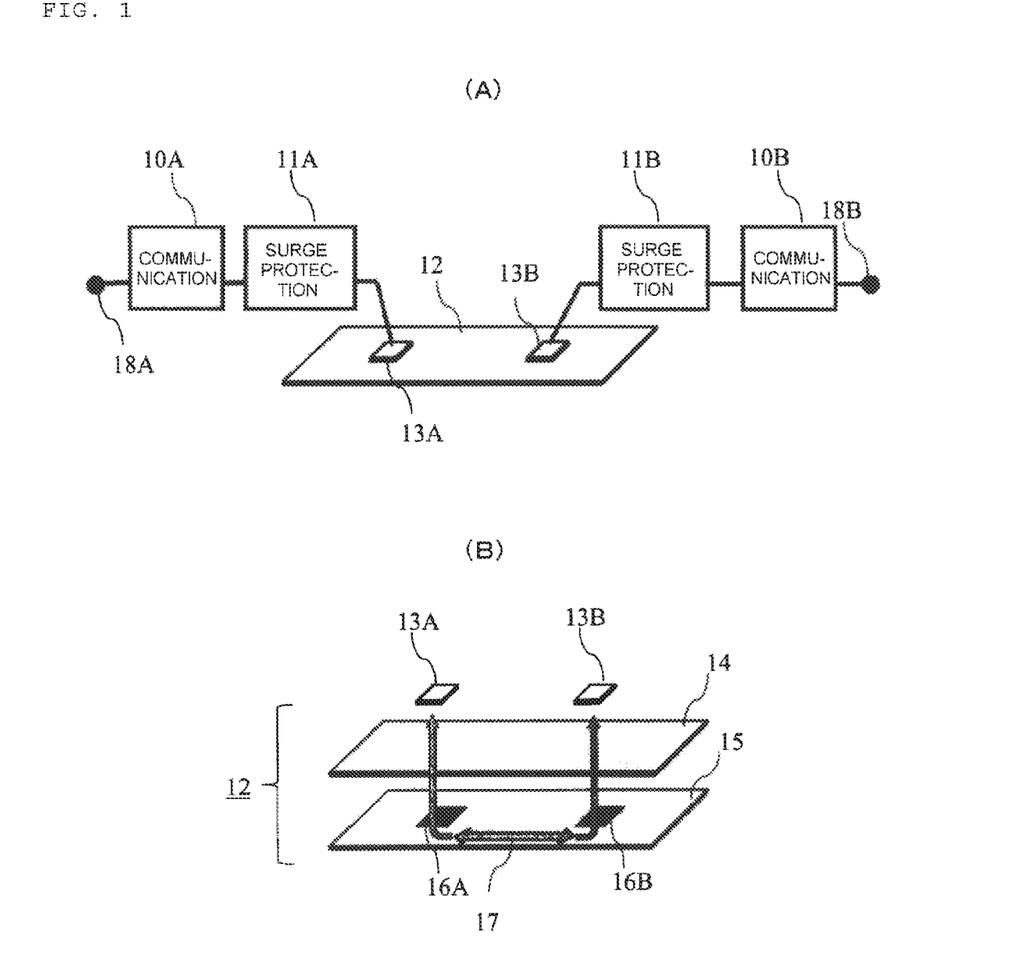
FIG. 1(A) is an explanatory diagram which illustrates a block diagram of an insulating communication system.
FIG. 1(B) is an explanatory diagram of a propagation path thereof.

FIG. 1(A) is a diagram which illustrates a block diagram of an insulating communication system of the present invention. A communication module is denoted by 10, a surge current protection circuit is denoted by 11, a propagation path having a waveguide structure is denoted by 12, and an antenna is denoted by 13. For example, a control logic circuit which is a low voltage circuit is connected to a terminal 18A of the communication system, a gate driver which is a high voltage circuit is connected to a terminal 18B, and a communication of a control signal is performed through the propagation path having a waveguide structure. A structure of the propagation path 12 is schematically illustrated in FIG. 1(B), and the propagation path 12 is configured by a waveguide 15 and an insulating layer 14. A specific configuration of the waveguide 15 will be described later, however, the structure is realized by interposing a dielectric layer between the upper and lower conductor layers Opening portions 16 are provided on the upper conductor layer. The antenna 13 and the waveguide 15 are electrically insulated through the insulating layer 14. A signal 17 from the antenna 13A (13B) is input to the waveguide 15 through the opening portion 16A (16B), and is propagated to the antenna 13B (13A) through the opening portion 16(B).

Figure 2:
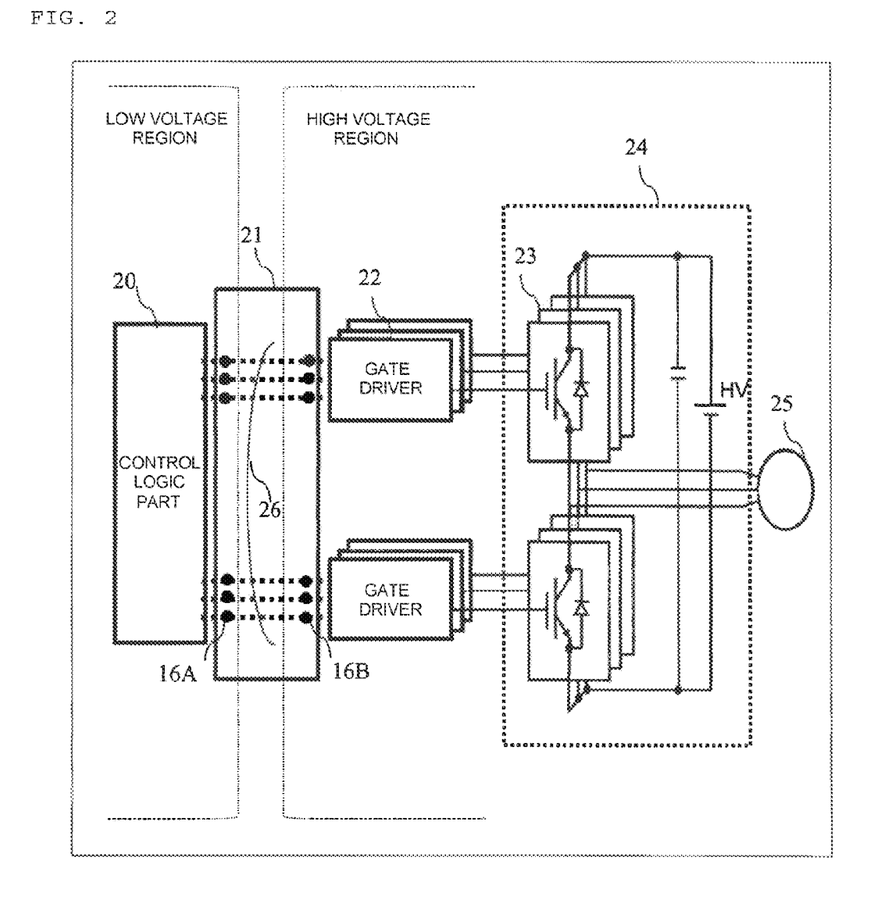
FIG. 2 is a diagram which illustrates an application example of the insulating communication system with respect to an inverter control system.

The insulating layer 14 is designed so as to have a sufficient withstand voltage with respect to a voltage which is applied between a signal line of a circuit which is connected to the antenna, or a terminal and a conductor portion of a ground and a conductor layer of a waveguide, or the like. Such an insulating design is important, in particular, when connecting circuits of which a difference in operation voltages is large to each other. An example of applying a communication system 21 of the present invention to an inverter control system which drives a motor 25 is illustrated in FIG. 2. An inverter 24 is configured by including an IGBT module 23, and generates an AC voltage which drives the motor 25 from a DC voltage HV (for example, several hundreds of V or more). A control logic part 20 controls the IGBT module 23 using a gate driver 22 in order to control the generated AC voltage. In addition, dotted lines 26 on the communication system 21, which connects the control logic part 20 to the gate driver 22 denote a communication channel. In the example, an example is illustrated in which the opening portions 16 are provided in each of the communication channels, however, it is also possible to share one opening portion 16 among the plurality of communication channels, as will be described later. Here, the control logic part 20, a communication module which is connected to a terminal 18A on the control logic part 20 side in the communication system 21, the surge protection circuit, and the antenna (not shown) are operated by a power supply voltage of the control logic part. Here, these are collectively referred to as a low voltage circuit. On the other hand, the gate driver 22, a communication module which is connected to the terminal 18B on the gate driver 22 side in the communication system 21, the surge protection circuit, and the antenna (not shown) are operated by a power supply voltage of the gate driver which is higher than that of the control logic part 20. Here, these are collectively referred to as a high voltage circuit.

The gate driver 22 drives the IGBT which is a switching element. For this reason, a potential fluctuation frequently occurs on the high voltage circuit side when a large current flows through a collector-emitter path of the IGBT. As it is understood from a structure in FIG. 1(B), DC voltages in the high voltage circuit, the low voltage circuit, and the waveguide 15 of the communication system are separated from each other through the insulating layer 14. However, an AC component due to the potential fluctuation is propagated in the waveguide 15. That is, due to the potential fluctuation which has occurred in the high voltage circuit, a displacement current (this is surge current) flows between the high voltage circuit and low voltage circuit. Some extent of the potential fluctuation is absorbed by the insulating layer 14, and due to a surge current protection circuit 11, it is possible to prevent an input out of rating from being applied to the communication module 10 and the low voltage circuit due to such a surge current.

In an insulating communication system in which the waveguide structure of the present invention is used, it is necessary to precisely design intervals between a waveguide and a signal line, a ground, an antenna or the like in order to realize miniaturization, and an improvement in solidity. Accordingly, it is preferable that a communicator which includes at least a waveguide and an antenna unit be integrated using a multilayer substrate. By integrating the communicator using the multilayer substrate, since it is possible to further precisely design an interval between conductor portions having different reference potentials, and electrical coupling, the improvement in solidity, and a desired insulation property can be secured using the minimum required space.

Figure 3:
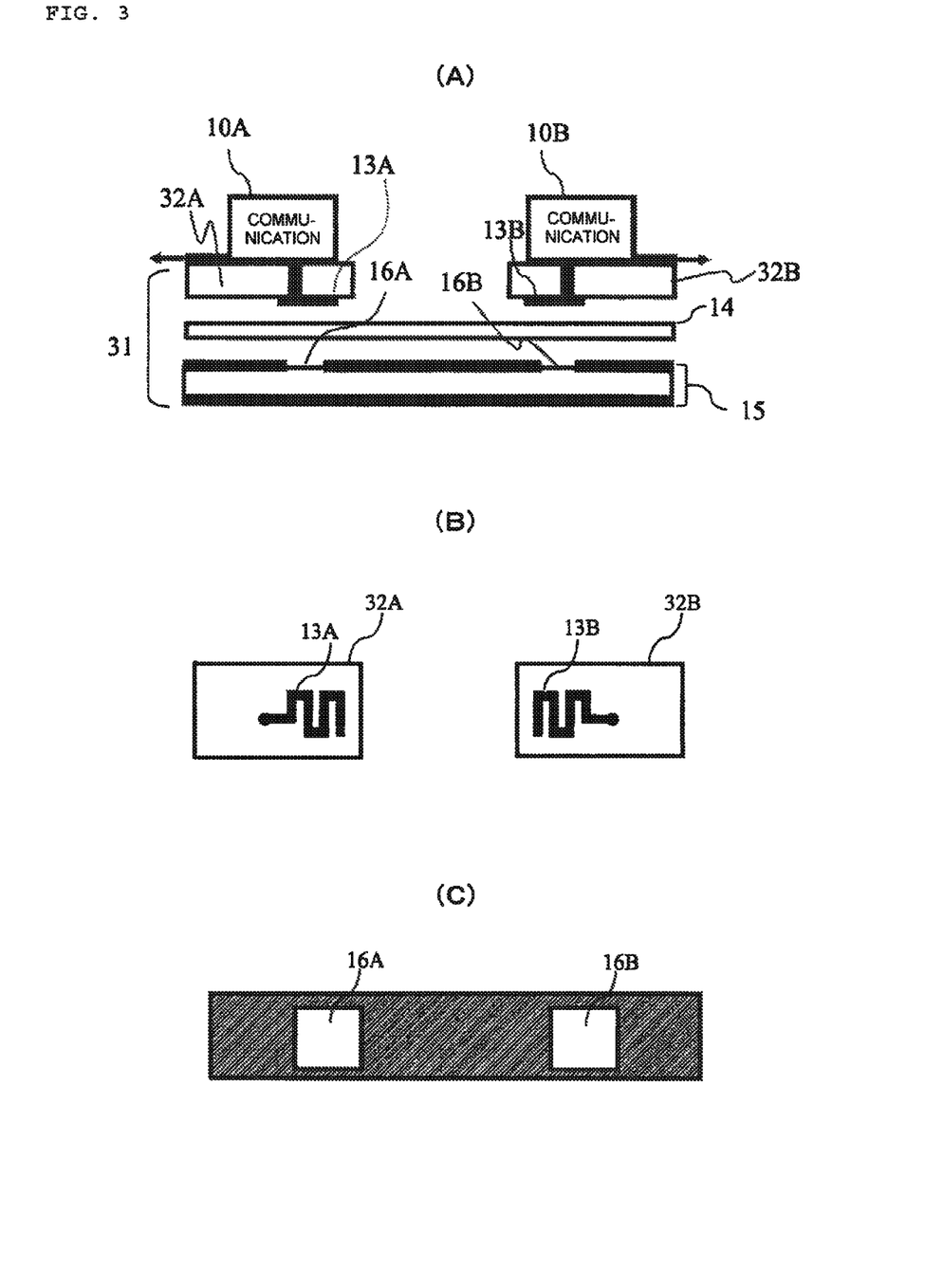

FIG. 3 is a configuration example of the insulating communication system in which the multilayer substrate is used. In addition, in the example, main parts are mainly displayed, and for example, the surge protection circuit 11 is omitted. A multilayer substrate 31 is configured by a communication substrate layer 32, the insulating layer 14, and the waveguide 15, and the multilayer substrate is displayed by being separated in order to distinguish the layers from each other, however, these layers are integrated. The waveguide 15 can be manufactured using a dielectric substrate which is copper foiled on both sides. The upper copper foil is provided with the opening portions 16. On the other hand, the communication substrate layer 32 is a layer on which a circuit of a communication module is mounted. In the example in FIG. 3, a communication substrate layer 32A which is connected to the control logic part (low voltage circuit), and a communication substrate layer 32B which is connected to the gate driver (high voltage circuit) are physically separated. Instead of this, when a conductor portion such as the signal line and the ground of the low voltage signal and a conductor portion such as the signal line and the ground of the high voltage signal are physically separated (that is, DC current is in insulated state), both may be connected as one substrate. In this manner, the signal line and the ground between the low voltage circuit and the high voltage circuit are physically separated, and a communication between the low voltage circuit and the high voltage circuit is performed through the waveguide 15 which is manufactured using the dielectric substrate which is copper foiled on both sides. The antenna 13 propagates an electromagnetic wave between the antenna and the opening portion of the waveguide 15. The insulating layer 14 is provided between the antenna 13 and the waveguide 15, and electrical insulating is maintained.

FIG. 3(B) illustrates a plan view (antenna surface) in which the communication substrate layer 32 is seen from the waveguide 15 side. The antenna 13 is formed by metal foil, and has the antenna length corresponding to a carrier wavelength which is used in communication. By bending the antenna as illustrated in the figure, a mounting area is reduced. The antenna 13 and the communication module 10 are connected through a through via, FIG. 3(C) illustrates a shape of the upper copper foil of the dielectric substrate which is copper foiled on both sides and forms the waveguide 15. In addition, though it is not shown, it is preferable that the side surface of the multilayer substrate 31 of the insulating communication system in FIG. 3 is covered with copper foil. This is for preventing electromagnetic noise from the outside from entering a communication path. This is the same as that in a configuration example in the communication system which will be described later.

When performing a communication through the waveguide 15, it is preferable that the communication module 10 has a configuration in which the communication is performed by up-converting a control signal to a carrier frequency from a baseband frequency, and by down-converting to the baseband frequency from the carrier frequency. By converting the control signal to a high frequency signal by performing the frequency conversion, it is possible to reduce the structure of the waveguide in size, and it is possible to easily separate inverter noise which is overlapped with the signal from the signal. For example, since the noise which is generated by an inverter operation is approximately 500 MHz or less, it is possible to sufficiently suppress an influence of noise by setting a frequency which is used in communication, for example, to 900 MHz to several GHz. In addition, since it is possible to suppress capacitance coupling between the antenna and the waveguide layer by reducing the antenna in size, it is easy to maintain insulating.

Figure 4:
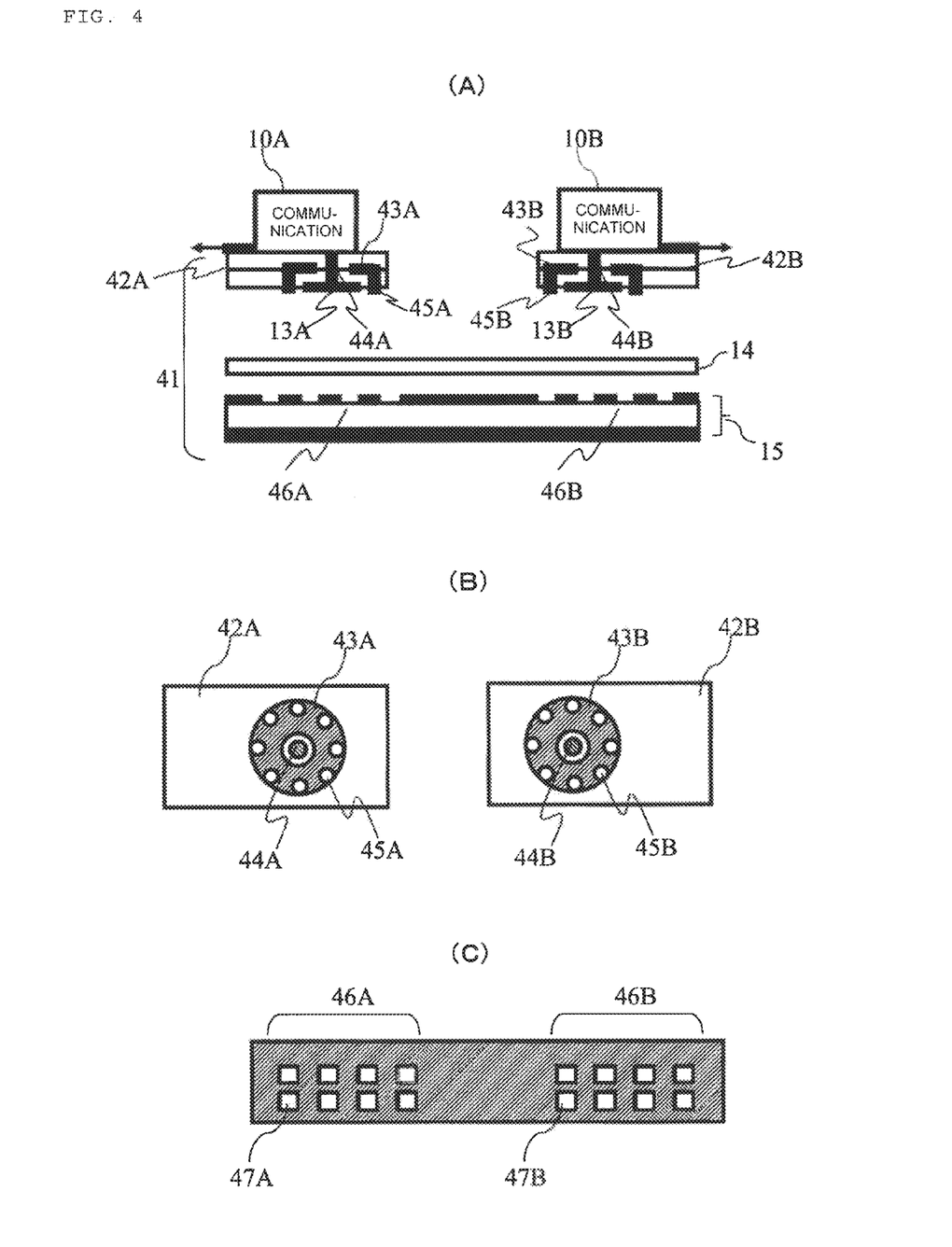

FIG. 4 is another configuration example of the insulating communication system using the multilayer substrate. A first characteristic is that a shield is provided at the periphery of the antenna. A communication substrate layer 42 (42A, 42B) is formed by a substrate of two layered dielectric layers, and an antenna shield conductor 43 (43A, 43B) is formed therebetween. FIG. 4(B) illustrates a plan view of the shield conductor 43 (43A, 43B). An opening portion is provided at a center portion of the shield conductor 43 (43A, 43B), and a through via 44 (44A, 44B) which connects the communication module 10 (10A, 10B) to the antenna 13 (13A, 13B) penetrates the opening portion. In addition, a dielectric layer on the lower side (waveguide 15 side) of the communication substrate layer 42 (42A, 42B) is provided with a plurality of through vias 45 (45A, 45B) so as to be connected to the shield conductor 43 (43A, 43B). Intervals of the plurality of through vias 45 (45A, 45B) are set to be sufficiently smaller than a communication wavelength. The antenna shield (the shield conductor 43 and the through vias 45) is used when reducing the external noise, and interference, or a leaking electromagnetic wave from the antenna. A second characteristic is that an opening portion 46 (46A, 46B) is realized using a plurality of small slots 47 (47A, 47B).

When controlling the electromagnetic wave which is radiated from the opening portion 46 (46A, 46B) to have a desired size, and a radiation pattern, it is effective to configure the opening portion to have a plurality of slots, not one slot, as illustrated in the example in FIG. 3.

Figure 5:
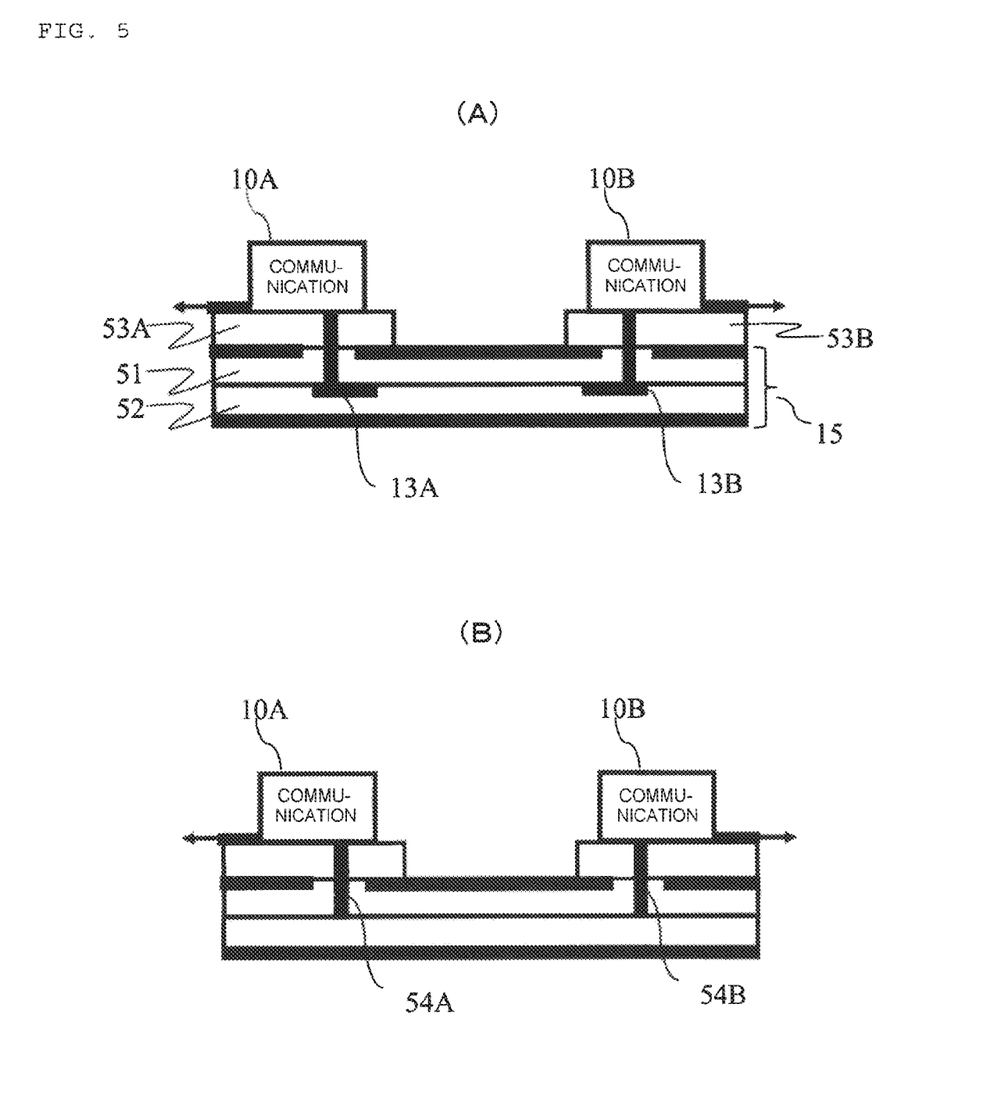
FIGS. 5A and 5B are configuration examples of the insulating communication system in which the multilayer substrate is used.

FIG. 5 is another configuration example of the insulating communication system in which the multilayer substrate is used. A characteristic thereof is that the antenna is provided inside the waveguide. The waveguide 15 is formed by two dielectric layers 51 and 52, the antenna 13 is formed in a conductor layer between the dielectric layers 51 and 52. In the structures in FIGS. 3 and 4, it is advantageous in that a design of an insulating body can be performed independently from a design of the waveguide, however, in contrast to this, in the structure in FIG. 5, it is necessary to perform the design of the insulating body in the design of the waveguide. Since the antenna 13 is mounted inside the waveguide in the structure in FIG. 5, when considering that reducing external noise and a leaking electromagnetic wave from the antenna is important, such a structure is effective. In addition, when it is preferable that gain of the antenna be small, a simple antenna not having a planar structure such as an antenna 54 (54A, 54B) may be used as illustrated in FIG. 5(B).

Figure 6:
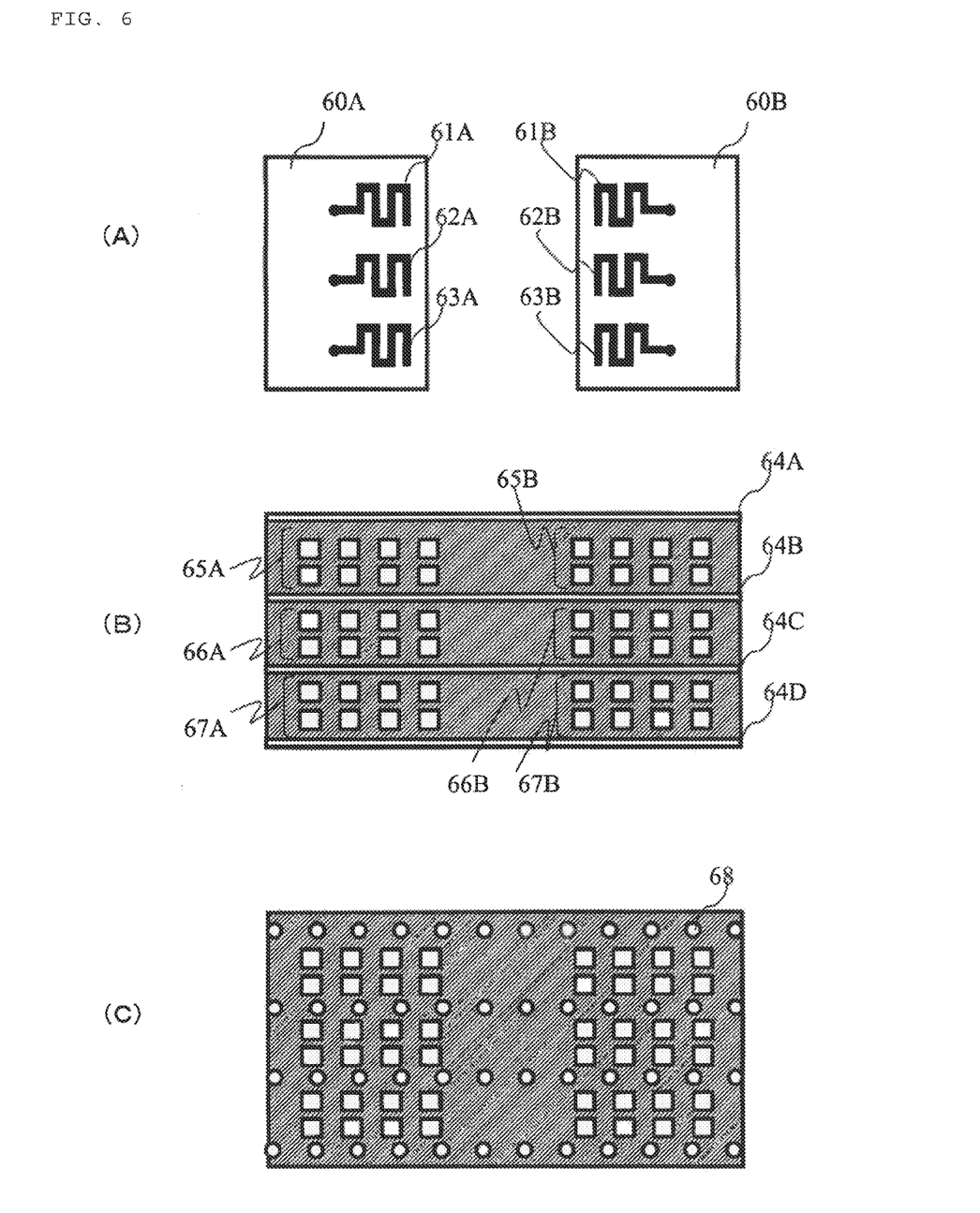

FIG. 6 is another configuration example of the insulating communication system in which the multilayer substrate is used. A characteristic thereof is that the plurality of waveguides are effectively mounted. FIG. 6(A) illustrates the antenna surface, and pair of antennas 61 to 63 are arranged in parallel. FIG. 6(B) schematically illustrates a cross-sectional view in an opening portion. The pair of antennas 61 (61A, 61B) corresponds to a pair of opening portions 65 (65A, 65B), the pair of antennas 62 (62A, 62B) corresponds to a pair of opening portions 66 (66A, 66B), and the pair of antennas 63 (63A, 63B) corresponds to a pair of opening portions 67 (67A, 67B). The waveguide can be divided into each channel by a shield (64A, 64B, 64C). As illustrated in FIG. 6(C), the shield is realized using vias 68. The through via 68 is a via the inside of a hole thereof is performed with conductor plating, and is in a floating state which is not electrically connected to other conductors (for example, metal foil or the like of the waveguides). In addition, an interval between the through vias 68 which are arranged in the longitudinal direction of the shield is set to be sufficiently smaller than a communication wavelength. In this manner, by providing the shield between the plurality of waveguides, it is possible to realize a plurality of effective waveguide layers in one waveguide layer. At this time, a shield as illustrated in FIG. 4 may be provided in the periphery of the antenna, as necessary.

Figure 7:
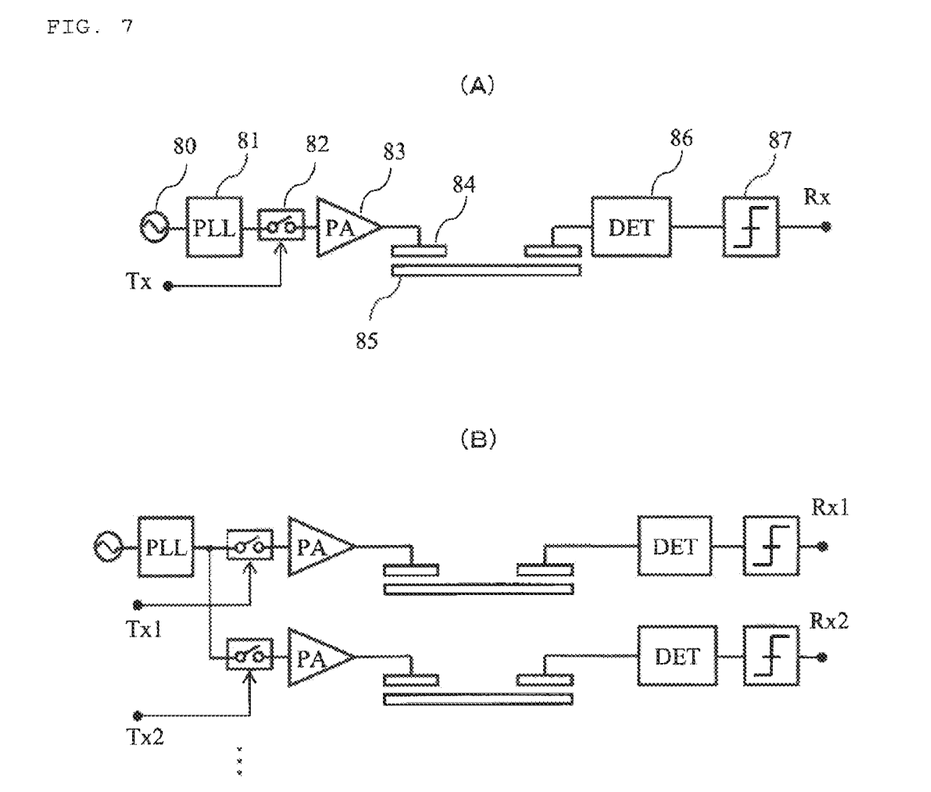

FIG. 7 is a block diagram which illustrates a configuration of a communication module when using OOK (On-Off-Keying). In the figure, 80 denotes an oscillator, 81 denotes a PLL (Phase Locked Loop), 82 denotes a switch, 83 denotes a power amplifier, 84 denotes the antenna surface, 85 denotes a waveguide layer, 86 denotes a wave detector, and 87 denotes a comparator. When using one communication channel in one waveguide in a communication between a low voltage circuit and a high voltage circuit, it is possible to construct a communication module using a simple communicator which simply performs On-Off of a carrier frequency as illustrated in FIG. 7(A) FIG. 7(B) illustrates a case in which a plurality of channels are used. In this configuration, a carrier frequency generation unit of a communication module can be shared by the plurality of channels, however, a transmitting circuit, a reception circuit, and a waveguide are necessary for each of the plurality of channels, excepting for that. In addition, the plurality of waveguides may be provided with the plurality of channels, effectively, with respect to one multilayer substrate as illustrated in FIG. 6.

Figure 8:
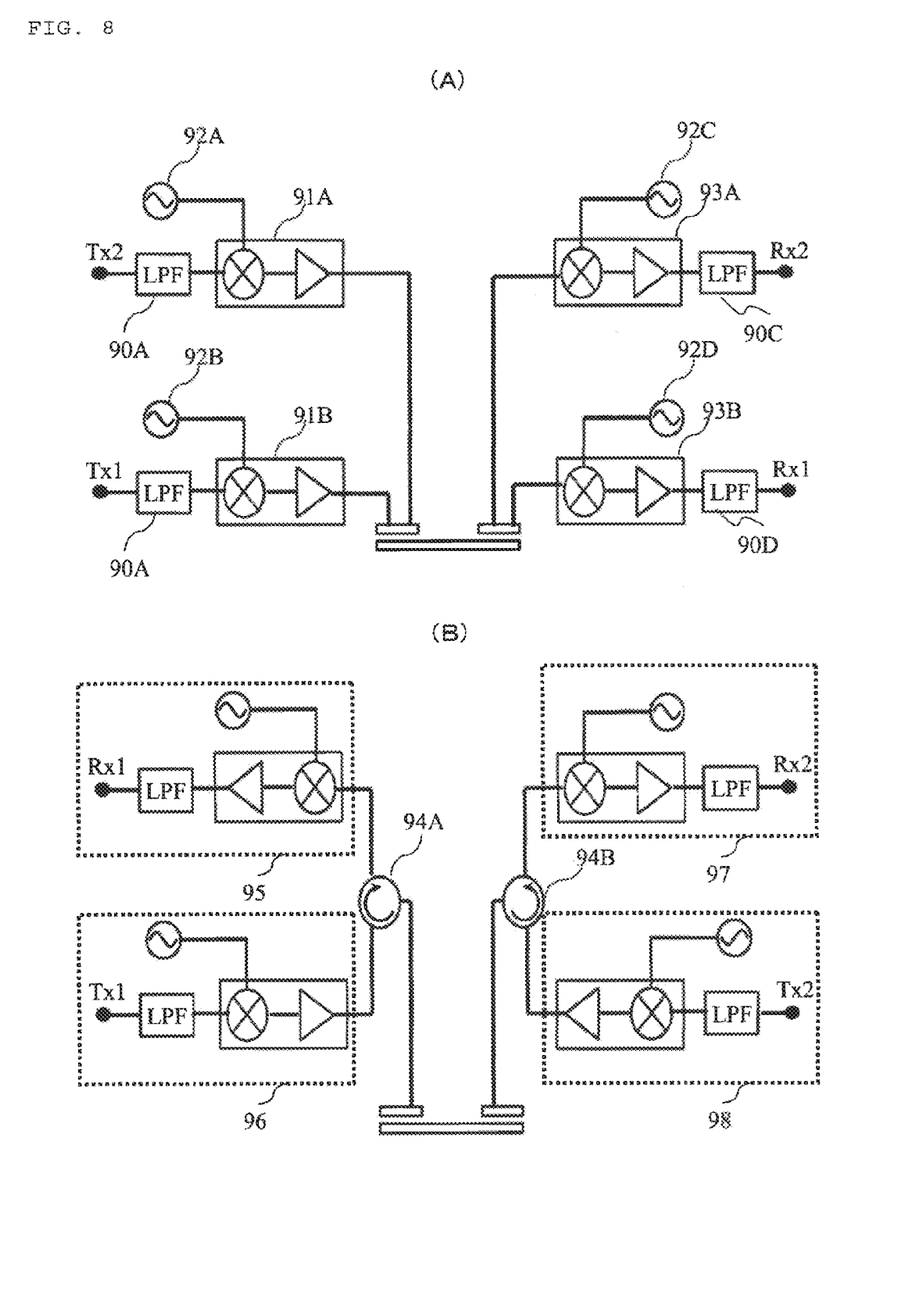

FIG. 8 is a block diagram which illustrates a configuration of a communication module when separating the plurality of communication channels using a frequency. A transmitter Tx1 and a receiver Rx1 communicate using a carrier frequency f1, and a transmitter Tx2 and a receiver Rx2 communicate using a carrier frequency f2. In the figure, 90 denotes a low pass filter, 91 denotes a modulator, 92 denotes a frequency synthesizer, 93 denotes a demodulator, and 94 denotes a circulator. In this configuration, a waveguide is shared by a plurality of channels as illustrated in FIG. 8(A), and the plurality of channels are separated by changing a carrier frequency. The cost of the communication module becomes expensive compared to the configuration in FIG. 7, however, it is possible to make the waveguide layer small, and a structure thereof simple. When isolation is needed between the communication modules which share the waveguide, it is preferable that an isolator, or circulator be inserted between the communication module and the waveguide. FIG. 8(B) is a diagram which illustrates a configuration in which the communication modules which share the waveguide are the transmission side and the reception side, respectively, and an antenna is shared, as well. In this example, a receiver 95 and a transmitter 96 share an antenna, and a receiver 97 and a transmitter 98 share an antenna.

Figure 9:
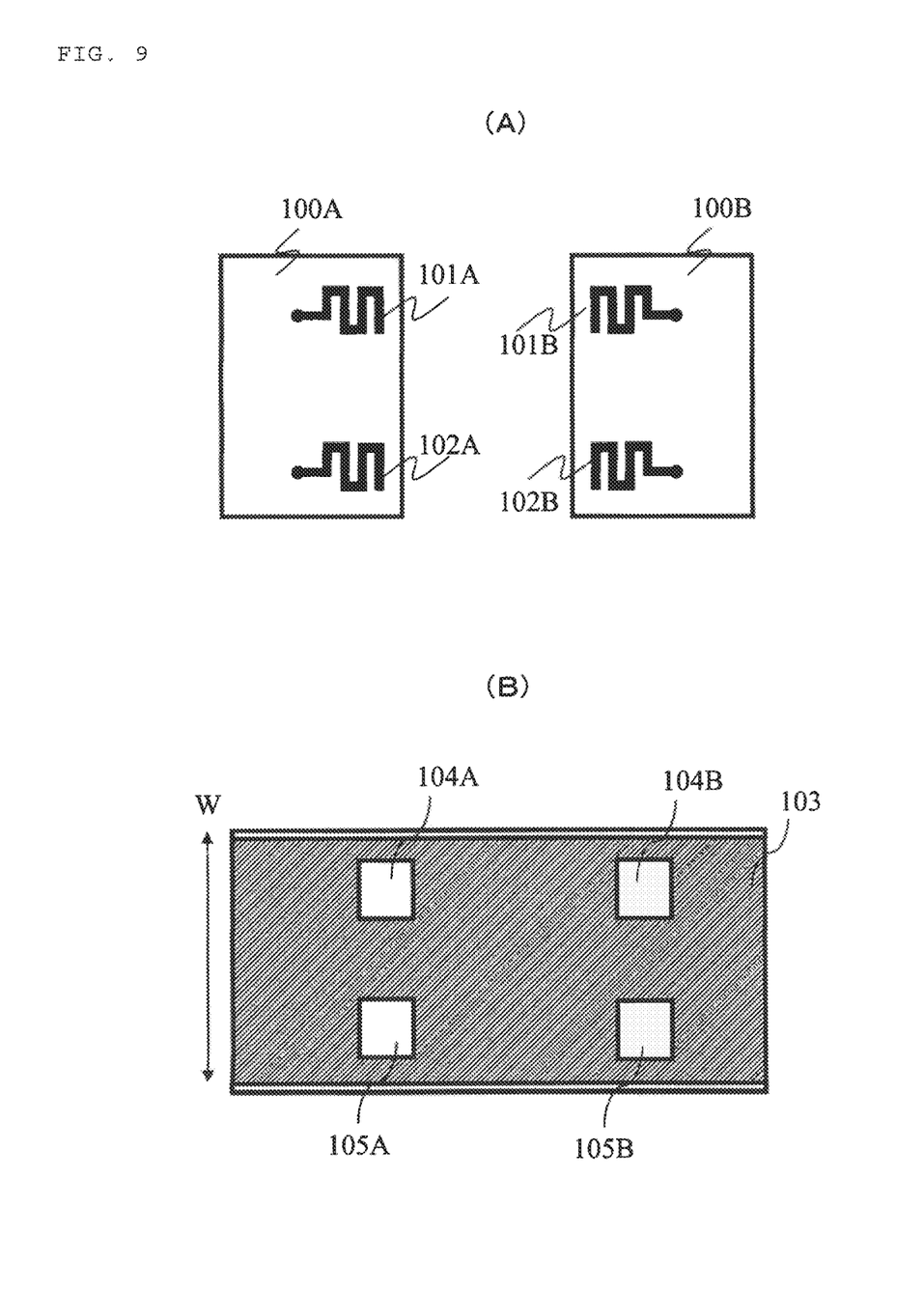
FIG. 9 is an explanatory diagram which illustrates a structure for realizing a small waveguide structure of a plurality of channels.

FIG. 9 is a diagram which illustrates a structure of a waveguide when a plurality of communication channels share the waveguide. FIG. 9(A) illustrates the antenna surface, and pair of antennas 101 to 102 are arranged in parallel. FIG. 9(B) schematically illustrates a cross-sectional view in opening portions. As illustrated in FIG. 8(A), in case of a configuration in which a communication module can perform transmission and reception by separating a plurality of channels, it is possible to miniaturize a communication system by providing a plurality of opening portions in one waveguide, and using a waveguide having a bus structure in which the respective opening portions are connected to a separate communication unit. For example, an antenna 101A (FIG. 9(A)) may be connected to a demodulator 91A (FIG. 8(A)), an antenna 101B (FIG. 9(A)) may be connected to a demodulator 93A (FIG. 8(A)), an antenna 102A (FIG. 9(A)) may be connected to a modulator 91B (FIG. 8(A)), and an antenna 102B (FIG. 9(A)) may be connected to a demodulator 93B (FIG. 8(A)). Though the waveguide is not separated as illustrated in FIG. 6, however, the antenna 101B selectively receives a signal from the antenna 101A, and the antenna 102B selectively receives a signal from the antenna 102A.

In general, the width of a waveguide is needed to have the width corresponding to a wavelength of a communication carrier. When one communication channel corresponds to one waveguide, each waveguide is needed to have the width corresponding to a wavelength of a communication carrier. In contrast to this, when a plurality of communication channels can share a waveguide, the width W of the waveguide which is shared may have the width corresponding to a communication carrier which is used. Accordingly, it is possible to realize miniaturization by sharing a waveguide. In addition, when a communication module separates a plurality of channels, in addition to the separating using a frequency which is illustrated in FIG. 8, the plurality of channels may be separated using time, space, a mark, or the like.

Figure 10:
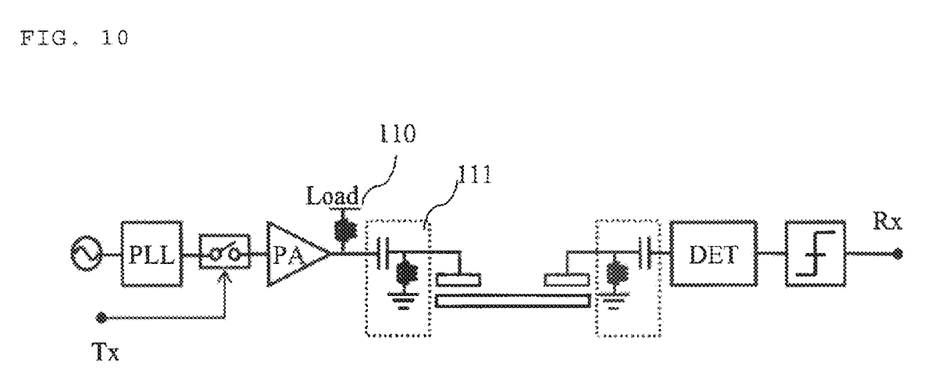
FIG. 10 is a configuration diagram of a surge current protection circuit.

FIG. 10 is a diagram which illustrates a configuration example in which a surge protection circuit for suppressing electric power which is applied to a communication module in a desired range is added in the configuration in FIG. 7. In the figure, 110 denotes a load inductor of a power amplifier, and 111 denotes the surge protection circuit. When applying the insulating communication system according to the present invention to circuits of which power supply potentials are largely different as in an inverter control system, a parasitic capacitance between the antenna surface and a waveguide layer becomes main capacitive coupling, and noise of a displacement current which exceeds the rating of a circuit may flow into a communication module, or a control logic circuit when there is a voltage fluctuation of a gate driver (high voltage circuit) It is preferable that the communication module have the surge protection circuit. 111 so that the communication module, or the control logic circuit is normally operated even when such noise occurs. In the example in FIG. 10, the surge protection circuit 111 is configured by an LC filter. When a main frequency component of a surge current which is generated by a voltage fluctuation of the gate driver (high voltage circuit) is sufficiently lower than a frequency band which is used in communication, a noise component and a signal can be separated using the LC filter. At this time, most of a surge current flow in the inductor of the surge protection circuit, and operations of the communication module are not largely influenced by those The surge protection circuit is not limited to the illustrated configuration, and can also be configured using an RC filter, a varistor, or a diode.

REFERENCE SIGNS LIST

10: COMMUNICATION MODULE
11: SURGE CURRENT PROTECTION CIRCUIT
12: PROPAGATION PATH HAVING WAVEGUIDE STRUCTURE
13: ANTENNA
14: INSULATING LAYER
15: WAVEGUIDE
16: OPENING PORTION
17: SIGNAL
18: TERMINAL

The invention claimed is:

1. A communication system which performs a communication between a control logic circuit which is operated using a first voltage and a circuit to be controlled which is operated using a second voltage, the system comprising:
  a multilayer substrate formed by laminating, in this order:
    a communication substrate layer;
    a metal conductor forming a first antenna;
    an insulating layer; and
    a waveguide;
  a first communication module mounted on the multilayer substrate, the first communication module converting a control signal from the control logic circuit to a first carrier frequency;
  a second antenna which receives the control signal which is converted to the first carrier frequency by passing through the first antenna and the waveguide; and
  a second communication module which reversely converts the control signal which is received in the second antenna, and converted to the first carrier frequency to a base band frequency,
  wherein the first voltage is higher than the second voltage;
  wherein the waveguide includes:
    dielectric layers and conductor layers interposed between the dielectric layers; and
    a first opening portion and a second opening portion corresponding to the first and second antennas, respectively, such that the control signal arrives at the second antenna by passing through the first antenna, the waveguide, and the first and second opening portions, and
  wherein the insulating layer maintains DC electrical insulation between the first antenna, the second antenna, and the conductor layer of the waveguide.

2. The communication system according to claim 1, wherein the first antenna is connected to the first communication module through a first surge protection current circuit, and the second antenna is connected to the second communication module through a second surge protection current circuit.

3. The communication system according to claim 1, wherein the first antenna is provided in a dielectric layer of the waveguide.

4. The communication system according to claim 3, wherein the dielectric layer of the waveguide is formed of two dielectric layers, and a metal conductor layer which forms the first antenna is provided between the two dielectric layers.

5. The communication system according to claim 1, wherein converting of the control signal into a carrier frequency is performed by switching the carrier frequency using a control signal which is expressed in binary.

6. The communication system according to claim 1, further comprising:

a third communication module which converts another control signal from the control logic circuit into a second carrier frequency;

a third antenna;

a fourth antenna which receives the another control signal which passes through the third antenna and the waveguide, and is converted to the second carrier frequency; and a fourth communication module which reversely converts another control signal, which is received by the fourth antenna, and is converted into the second carrier frequency, into a base band frequency.

7. The communication system according to claim 6, wherein the waveguide includes a first opening portion which corresponds to the first antenna;

a second opening portion which corresponds to the second antenna;

a third opening portion which corresponds to the third antenna; and a fourth opening portion which corresponds to the fourth antenna, wherein the first carrier frequency and the second carrier frequency are the same as each other, and wherein a first communication channel is realized between the first and second communication modules, and a second communication channel is realized between the third and fourth communication modules, by providing shields so that the first and second opening portions, and the third and fourth opening portions are separated.

8. The communication system according to claim 6, wherein the waveguide includes a first opening portion which corresponds to the first antenna;

a second opening portion which corresponds to the second antenna;

a third opening portion which corresponds to the third antenna; and a fourth opening portion which corresponds to the fourth antenna, wherein the first carrier frequency and the second carrier frequency are different from each other, and a first communication channel is realized between the first and second communication modules, and a second communication channel is realized between the third and fourth communication modules when the second antenna selectively receives the control signal which is converted to the first carrier frequency, and when the fourth antenna selectively receives another control signal which is converted to the second carrier frequency.

* * * * *